(12) United States Patent
Zhang et al.

(10) Patent No.: US 9,325,835 B2
(45) Date of Patent: Apr. 26, 2016

(54) METHODS AND APPARATUS FOR IMPROVING DEVICE FUNCTIONALITY DURING LONG BLOCKING UICC OPERATIONS

(71) Applicant: QUALCOMM Incorporated, San Diego, CA (US)

(72) Inventors: Jiang Zhang, San Diego, CA (US); Michele Berionne, San Diego, CA (US); Aram Perez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/293,946

(22) Filed: Jun. 2, 2014

(65) Prior Publication Data
US 2014/0357249 A1    Dec. 4, 2014

Related U.S. Application Data

(60) Provisional application No. 61/830,441, filed on Jun. 3, 2013.

(51) Int. Cl.
| | | |
|---|---|---|
| H04W 68/00 | (2009.01) | |
| H04M 1/725 | (2006.01) | |
| H04L 29/06 | (2006.01) | |

(52) U.S. Cl.
CPC ........... *H04M 1/72569* (2013.01); *H04L 69/02* (2013.01); *H04W 68/00* (2013.01); *H04M 2201/06* (2013.01)

(58) Field of Classification Search
CPC ..................... H04M 1/72569; H04M 2201/06; H04W 68/00; H04L 69/02
USPC ........................ 455/41.3, 414.1, 418; 726/1, 2
See application file for complete search history.

(56) References Cited

U.S. PATENT DOCUMENTS

| | | | |
|---|---|---|---|
| 2006/0113379 A1* | 6/2006 | Cricco | 235/380 |
| 2008/0311853 A1* | 12/2008 | Tamura | 455/41.3 |
| 2009/0165077 A1* | 6/2009 | Heiner et al. | 726/1 |

(Continued)

FOREIGN PATENT DOCUMENTS

| | | |
|---|---|---|
| WO | WO-02/14884 A2 | 2/2002 |
| WO | WO-2009/133029 A1 | 11/2009 |

OTHER PUBLICATIONS

International Search Report and Written Opinion—PCT/US2014/040694—ISA/EPO—Aug. 1, 2014. (11 pages).

(Continued)

*Primary Examiner* — Nathan Taylor
(74) *Attorney, Agent, or Firm* — Arent Fox LLP

(57) ABSTRACT

Methods and apparatuses are presented herein for improved operation of a Universal Integrated Circuit Card (UICC) of one or more user equipment (UE). For example, an example method of wireless communications is presented, which may include monitoring, by a UE, one or more items received from a UICC of the UE during a UICC operation. In addition, the example method may also include determining that at least one of (a) a number of the one or more items having a first item type exceeds a threshold number, or (b) an elapsed time since the UICC operation started exceeds a threshold time. Moreover, the example method may include providing, based on the determining, a notification to a user interface associated with the UE indicating that the UICC operation is ongoing.

30 Claims, 7 Drawing Sheets

(56) References Cited

U.S. PATENT DOCUMENTS

| | | | |
|---|---|---|---|
| 2010/0255819 A1* | 10/2010 | Robles et al. | 455/414.1 |
| 2012/0008164 A1* | 1/2012 | Nanaumi | 358/1.15 |
| 2013/0347064 A1* | 12/2013 | Aissi | 726/2 |

OTHER PUBLICATIONS

"Smart Cards: Test specification for UICC Application Programming Interface for Java Card(TM) for Contactless Applications, Test Environment and Annexes [ ], SCPTEST(12)028019_ETSI_TS_TEST_HCI_API_r4_VALID_PROP", ETSI Draft, SCPTEST(12)028019_ETSI_TS_TEST_HCI_API_R4_VALID_PROPOSAL, European Telecommunications Standards Institute (ETSI), 650, Route Des Lucioles, F-06921 Sophia-Antipolis, France, vol. SCP, No. V0.1.0, Sep. 7, 2012, pp. 1-74, XP014099986, [retrieved on Sep. 7, 2012] the whole document.

* cited by examiner

METHODS AND APPARATUS FOR IMPROVING DEVICE FUNCTIONALITY DURING LONG BLOCKING UICC OPERATIONS

CLAIM OF PRIORITY UNDER 35 U.S.C. §119

The present Application for Patent claims priority to Provisional Application No. 61/830,441 entitled "Methods and Apparatus for Improving Device Functionality During Long Blocking UICC Operations" filed Jun. 3, 2013, and assigned to the assignee hereof and hereby expressly incorporated by reference herein.

BACKGROUND

Aspects of the present disclosure relate generally to wireless communication systems, and more particularly, to assisting a device avoid the loss of functionality during long blocking operations on a Universal Integrated Circuit Card (UICC).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Currently, a user equipment (UE) may use a UICC to enable various functionalities within an access network. In addition to telecommunication functionalities, the UICC can include applications and/or information used for other purposes, such as mobile payments, banking, transportation and so on. In some cases, the UICC may perform operations that have a relatively long time period before completion (e.g., potentially longer than a minute), such as the generation of public keys or installation of an applet. Further, the UE may be required to wait for access to the UICC when the UICC continuously sends NULL procedure bytes to the UE. Such NULL procedure bytes may be sent while a UICC operation is ongoing and until the UICC operation is complete. During this waiting period, the UE may not be able to send other commands to the UICC. As such, other operations on the UE which may need to contact the UICC, such as network authentication functions, call control procedures (required to establish a call) and others, may be blocked from accessing the UICC applications and/or information. This blocking during the waiting period may severely affect the user experience and may also violate regional regulations.

Thus, improved apparatus and methods to assist a device avoid the loss of functionality during long blocking operations with a UICC may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving device functionality during long blocking operations with a UICC. In an aspect, an example method of wireless communications is presented, which may include monitoring, by a UE, one or more items received from a UICC of the UE during a UICC operation. Furthermore, the example method may include determining that at least one of (a) a number of a first item of the one or more items that have been received from the UICC exceeds a threshold number, or (b) an elapsed time since the UICC operation started exceeds a threshold time. In addition, the example method may include providing, based on the determining, a first notification to a user interface associated with the UE indicating that the UICC operation is ongoing.

In an additional aspect, the present disclosure presents an example apparatus for wireless communications, which may include means for monitoring, by a UE, one or more items received from a UICC of the UE during a UICC operation. Furthermore, the example apparatus may include means for determining that at least one of (a) a number of the one or more items having a first item type exceeds a threshold number, or (b) an elapsed time since the UICC operation started exceeds a threshold time. Additionally, the example apparatus may include means for providing, based on the determining, a first notification to a user interface associated with the UE indicating that the UICC operation is ongoing.

Moreover, the present disclosure presents an example apparatus for wireless communication, which may include a monitoring component configured to monitor, by a UE, one or more items received from a UICC of the UE during a UICC operation. In addition, the UE may include a threshold managing component configured to determine that at least one of (a) a number of the one or more items having a first item type exceeds a threshold number, or (b) an elapsed time since the UICC operation started exceeds a threshold time. Additionally, the UE may include a user interface managing component configured to provide, based on the determining, a first notification to a user interface associated with the UE indicating that the UICC operation is ongoing.

In a further aspect of the present disclosure, an example non-transitory computer-readable medium is presented that may include instructions, that when executed by a processor, cause the processor to monitor, by a UE, one or more items received from a UICC of the UE during a UICC operation. In addition, the computer-readable medium may further include instructions, that when executed by the processor, may cause the processor to determine that at least one of (a) a number of the one or more items having a first item type exceeds a threshold number, or (b) an elapsed time since the UICC operation started exceeds a threshold time. Furthermore, the computer-readable medium may further include instructions, that when executed by the processor, may cause the processor to provide, based on the determining, a first notification to a user interface associated with the UE indicating that the UICC operation is ongoing.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. For purposes of the present disclosure, the term "component" refers to one of the parts that make up a system and may be hardware or software and may be subdivided into other components. The terms module, component, unit, and structure may be used interchangeably herein.

Figure 1:
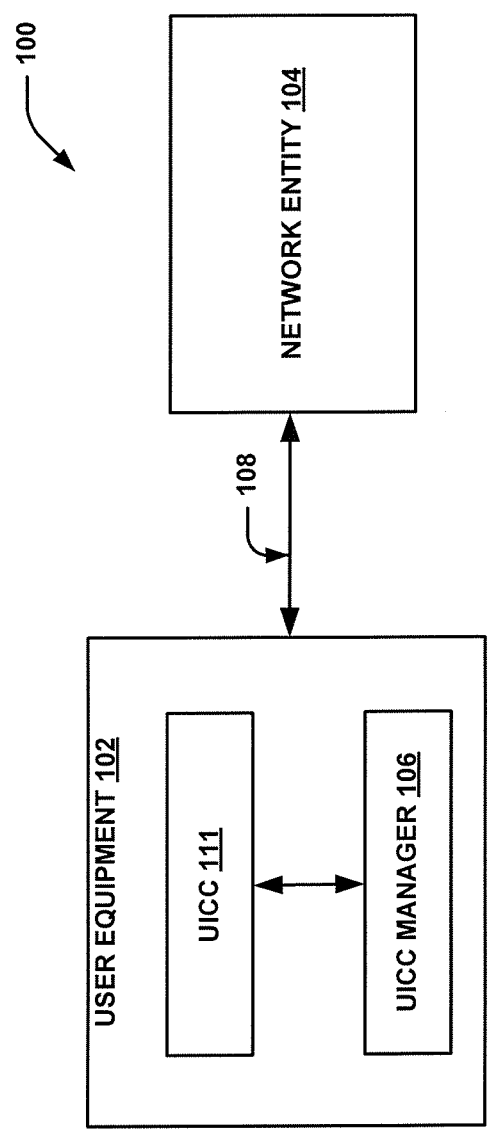
FIG. 1 is a block diagram illustrating an example wireless communications system according to the present disclosure.

The various concepts presented throughout this disclosure may be implemented across a broad variety of telecommunication systems, network architectures, and communication standards. By way of example and without limitation, the aspects of the present disclosure illustrated in FIG. 1, which is a schematic diagram illustrating a system 100 for wireless communication, according to an example configuration. FIG. 1 includes an example network entity 104, which may communicate wirelessly with one or more UEs 102 over one or more wireless communication channels 108, which may include, in a non-limiting aspect, data communication channels, paging channels, broadcast channels, control channels, or any other over-the-air (OTA) communication channel known in the art.

UE 102 may comprise any type of mobile device, such as, but not limited to, a smartphone, cellular telephone, mobile phone, laptop computer, tablet computer, or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a machine-to-machine (M2M) device, a device associated with the Internet of Things, or some other suitable terminology. In general, UE 102 may be small and light enough to be considered portable and may be configured to communicate wirelessly via an over-the-air communication link using one or more OTA communication protocols described herein.

Furthermore, network entity 104 of FIG. 1 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a small cell. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. Additionally, network entity 104 may communicate with one or more other network entities of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, network entity 104) may be coupled to a core network via one or more wired or wireless connections.

The UE 102 may further include a universal integrated circuit card (UICC) 111 and a UICC manager 106 configured to communicate with and manage operation of the UICC 111. In a UMTS system, the UICC 111 may further include a universal subscriber identity module (USIM), which contains a user's subscription information to a network. Furthermore, though UICC 111 and UICC manager 106 may comprise separate and distinct components (as illustrated in FIG. 1), UICC manager 106 may alternatively comprise a subcomponent of UICC 111 or may be otherwise included in UICC 111.

In an aspect, some operations between the UICC 111 and the UE 102 may be performed at a runtime (e.g., during public key generation operations, etc.). In an aspect, the UICC 111 may send one or more NULL procedure bytes to the UE 102. For purposes of the present disclosure, the one or more NULL procedure bytes may include one or more bytes that may be sent from the UICC to the UE 102 (or a component/processor therein) that are configured to indicate that a UICC operation is still pending or otherwise ongoing. In some examples, the one or more NULL bytes may comprise a byte having a value of zero (e.g., a byte with a 0x00 hexadecimal value). As discussed in further detail with respect to the flowchart provided in FIG. 3, below, when UE 102 has received the NULL procedure bytes more than a threshold number of times (e.g., 5 times) and/or for more than a threshold amount of time (e.g., 15 seconds), the UE 102 may prompt a user interface to notify the user that the UE 102 is waiting for UICC 111 to complete what is a time-consuming operation.

Figure 2:
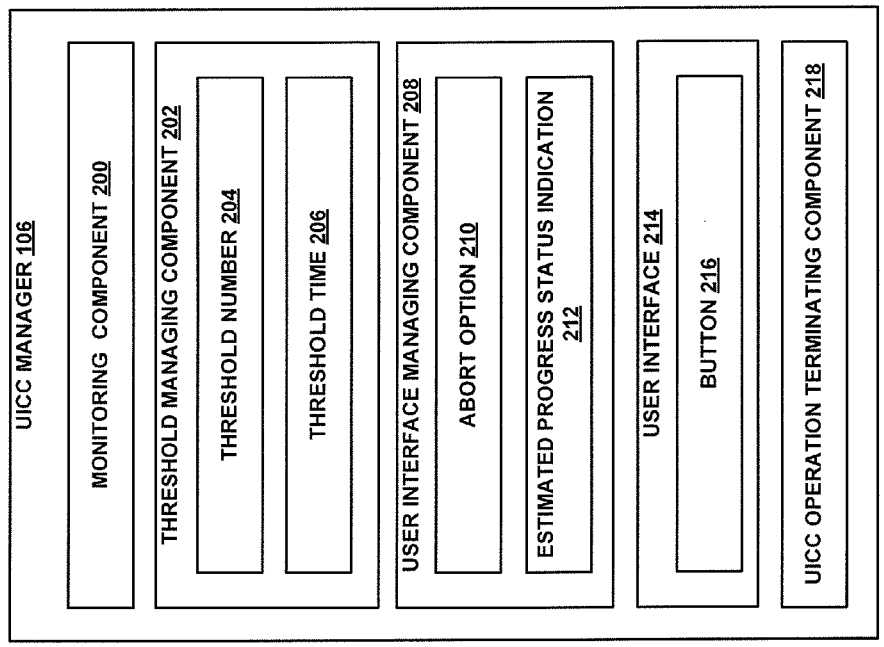
FIG. 2 is a block diagram illustrating an example UICC manager according to an example apparatus of the present disclosure.

Turning to FIG. 2, an example UICC manager 106 (of FIG. 1, for example) is presented as comprising a plurality of individual components for carrying out the one or more methods or processes described herein. In an aspect, each of the components of UICC manager 106, and UICC manager 106 itself, may be software components running in a processor (e.g., processor 404 of FIG. 4, below), resident/stored in a computer-readable medium (e.g., computer-readable medium 406 of FIG. 4, below), one or more hardware modules coupled to the processor, or some combination thereof.

For example, in an aspect, UICC manager 106 may include a monitoring component 200, which may be configured to monitor one or more items received from a UICC of the UE during a UICC operation. For purposes of the present disclosure, the term "item" may refer to a piece of structured data (e.g., message, field, flag, packet, bit, byte, or any other form of data) from which information about various aspects of operations, functionality, and/or applications related to the UICC or the UE may be determined or identified. For example, the one or more items may include UE-, application-, UICC-, or subscriber identity-specific information that allows an application executed by the UE, or the UE, generally, to determine the status of a particular UICC operation (e.g., whether the UICC operation is ongoing or that the UICC operation has completed). In some examples, each of the one or more items may have an associated item type (e.g., first item type, second item type, etc.), which indicates a type, class, classification, or kind of item. For example, in an aspect, the one or more items may include one or more NULL procedure bytes received from the UICC. Thus, in an aspect, a first item type may correspond to a NULL procedure byte. In an additional aspect, the one or more items may include one or more indicators (which may comprise a message, field, flag, packet, bit, byte, or any other form of data) that indicate that a UICC operation is complete. Therefore, in an aspect, a second item type may correspond to an indicator that indicates that a UICC operation is complete. Furthermore, for purposes of the present disclosure, a UICC operation may be considered complete where each computation, calculation, method, or any other process associated with the UICC operation has been fully executed or otherwise completed.

Furthermore, for purposes of the present disclosure, a "UICC operation" may refer to any operation associated with a UE (e.g., UE 102 of FIG. 1) that involves communicating with, writing data to, and/or reading data from, UICC 111. In some examples, the UICC operation may have an associated "type," or "type of UICC operation," which, for purposes of the present disclosure, may include, but is not limited to, a public key generation operation or installation of an applet or any other software or machine-executable instructions on the UICC. Furthermore, for purposes of the present disclosure, a "public key generation operation" may include any operation performed by a UICC associated with generating one or more public keys, for example, for data encryption and/or information security purposes.

In addition, in some examples, one or more functions associated with the UICC may be blocked from proceeding during the UICC operation (e.g., by UICC manager 106). In some examples, the blocked functions may include one or more authentication functions associated with acquiring UE access to a network or one or more call control functions to perform a voice or data call associated with the UE.

In addition, UICC manager 106 may include a threshold managing component 202, which may be configured to compare one or more values against one or more thresholds associated with the UICC. In an aspect, these thresholds may include a threshold number 204 of items having a first item type that have been received by the UICC, for example, during an operation. In some examples, the threshold number 204 may comprise any number (e.g., integer numbers) from zero to 500, including any number from zero to ten, and may, in some examples, comprise five. Alternatively or additionally, the thresholds may include threshold time 206. In an aspect, an elapsed time since the UICC operation started may be compared against threshold time 206 to determine whether the elapsed time exceeds the threshold time 206. In some examples, the threshold time 206 may comprise any period of time, such as, but not limited to, anywhere from one second to 100 seconds, including any time period from five to twenty-five seconds, including fifteen seconds.

Furthermore, in an aspect, threshold managing component 202 may be configured to determine that a number of the one or more items received from the UICC having the first item type exceeds the threshold number 204. In an example where the first item type comprises a NULL procedure byte, the threshold managing component 202 may determine, based on the threshold number 204, that too many NULL procedure bytes have been received by the UE 102 and, therefore, that the UICC operation is a relatively high time-consuming operation (e.g., the UICC operation is taking too long to complete). Alternatively or additionally, threshold managing component 202 may be configured to determine that an elapsed time since the UICC operation started exceeds the threshold time 206. For example, the threshold managing component 202 may determine, based on the threshold time 206, whether the UICC operation is a time-consuming operation (e.g., the UICC operation is taking too long to complete). In an aspect, these determinations may be made based on the comparison of one or more values (e.g., a number of items having a first item type received from the UICC and/or an elapsed time since the UICC operation started) against the one or more thresholds (e.g., threshold number 204 and threshold time 206) performed by threshold managing component 202.

Additionally, UICC manager 106 may include a user interface managing component 208, which may be configured to provide a one or more notifications (e.g., first, second, or further notifications) to a user interface 214 associated with the UE. In an aspect, such notifications may include one or more objects (e.g., text box, message, or the like) conveying information that can be directly displayed to a user via the user interface 214. For example, the user interface managing component 208 may be configured to provide a first notification to a user interface 214 associated with the UE indicating that a UICC operation is ongoing. Alternatively or additionally, the user interface managing component 208 may be configured to provide a second notification to the user interface indicating successful completion of the UICC operation to the user interface 214. In an aspect, the user interface 214 may be configured to display the one or more notifications to a user via a display (e.g., display screen, touch screen, or other display device associated with the UE).

Furthermore, user interface managing component 208 may be configured to provide (e.g., display or otherwise convey to the user via a display) an abort option 204 through the user interface to allow a user an option to terminate or otherwise abort the UICC operation prior to completion of the UICC operation. Thus, for purposes of the present disclosure, the term "abort option" may include any command or instruction that, when executed by the UICC manager may cause the UICC manager 106 to terminate or otherwise abort an ongoing UICC operation prior to completion of the UICC operation. In an aspect, the user interface may also provide the user a button 216 to abort this pending UICC operation, for example, if some other more critical task (e.g., an emergency call) is attempting to access the UICC. In an aspect, selection of the button 216 by user input, user activation, or some other user action may prompt the UE 102 to reset the UICC 111. As used herein, the button 216 may be a physical button on the UE 102, a software button on a touch screen, or any other virtual button presented to a user via user interface 214 for potential activation by touching a screen, etc. Further, the button 216 may be disabled or removed once the UICC operation is completed. In some examples, abort option 210 may be provided to a user after a time duration beyond an estimated total time for the UICC operation has elapsed. For purposes of the present disclosure, an "estimated total time" for the UICC operation may include an estimation of a time period or duration associated with the particular UICC operation. This estimated total time may be based on historical time periods of past executions of the UICC operations (e.g., a time period of a preceding iteration of a UICC operation or an average of all past instances of the UICC operation) or may include a static time period or duration associated with the UICC operation that may be stored in memory. In an aspect, user interface managing component 208 may obtain (e.g., look up in memory, compute, receive, or otherwise obtain) an estimated total time for the UICC operation and may start a timer (not shown) when the UICC operation has started. If the time period of the timer exceeds the estimated total time for the UICC operation by a particular time period or amount of time, the user interface managing component 208 may provide the abort option 210 to the user via user interface 214.

In another aspect, the user interface managing component 208 may be configured to provide an estimated progress status indication 212 for the UICC operation through the user interface 214. For example, the user interface 214 may display the estimated progress status indication 212 (e.g., a progress bar, pie, etc.) to the user to show the progress of the UICC operation. The UICC operation estimated progress status indication 212 may indicate a percentage of completion of the UICC operation, or conversely, may indicate a remaining percentage for completion of the UICC operation. In an additional or alternative aspect, the UE 102 may query the estimated time of the UICC operation before the operation starts. In another aspect, the estimated time may be based on the type of UICC operation and/or prior UICC operations performed by the UE.

In an additional aspect, user interface managing component 208 may be configured to remove (e.g., not display) the first notification from the user interface 214. Furthermore, UICC managing component 106 may include a UICC operation terminating component 218, which may be configured to terminate a UICC operation prior to completion of the UICC operation. In some examples, UICC operation terminating component 218 may be configured to terminate a UICC operation based on receiving a user input through the user interface indicating that the abort option 210 has been selected, for example, by a user selecting or otherwise activating button 216. In an aspect, the UICC operation terminating component 218 may be configured to communicate with the UICC in a manner so as to avoid resetting the UICC upon termination of the operation. In another aspect, such a communication may reset the UICC.

Through exemplary components 200, 202, 204, 206, 208, 210, 212, 214, 216, and 218 are presented in reference to UICC manager 106, they are not exclusive. Instead, UICC manager 106 may include additional or alternative components configured to perform aspects of the present disclosure and the claims recited below.

Figure 3:
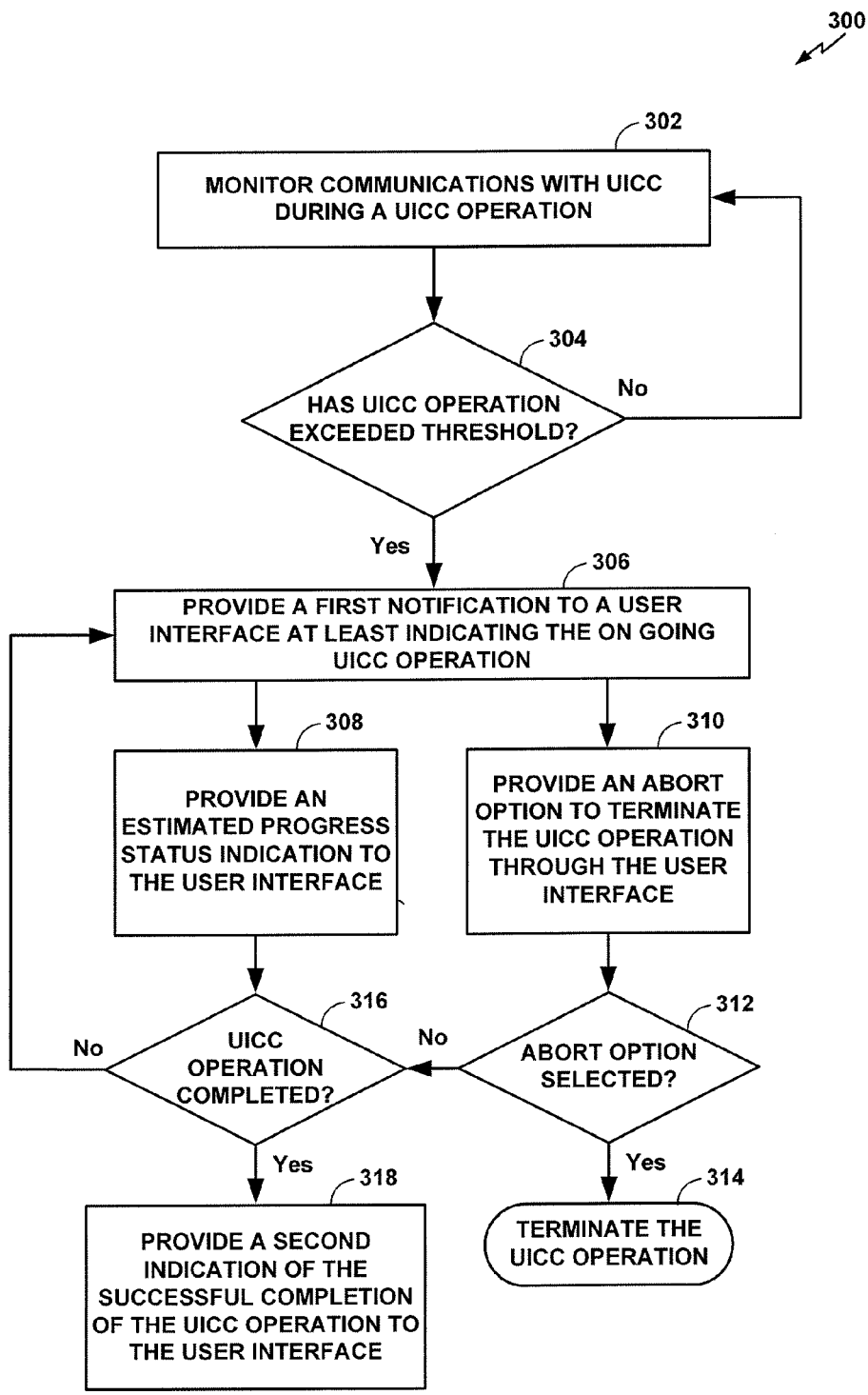
FIG. 3 is a flow diagram comprising a plurality of functional blocks representing an example methodology of the present disclosure.

Turning to FIG. 3, an example methodology 300 is displayed that improves UE functionality, for example, during long blocking operations with a UICC. In an aspect, the methodology may be performed by a UE (e.g., UE 102 of FIG. 1) with a UICC (e.g., UICC 111 of FIG. 1) operating within the UE, or may be performed by one or more components within the UE (e.g., UICC manager 106 of FIGS. 1 and 2 or the components of FIG. 2 therein).

In an aspect of methodology 300, at block 302, the UE may monitor communications with a UICC during a UICC operation. In an aspect, monitoring component 200 of FIG. 2 may monitor such communications with the UICC 111 of FIG. 1. For example, in an aspect, at block 302, the UE may monitor one or more items received from the UICC of the UE during the UICC operation. In an aspect, an example item that may be monitored is a NULL procedure byte (i.e., a first item type) that may be sent by the UICC when the UICC operation is still pending. In an additional aspect, an example item that may be monitored is an indication that indicates that a UE operation is complete (i.e., a second item type).

In addition, at block 304, the UE may determine whether the UICC operation has exceeded a threshold. In an aspect, such a determination may be performed by threshold managing component 202, and may be based on the reception of one or more items having a first item type, where the first item type may include a NULL procedure byte. Thus, in an aspect, the threshold may be based on a number of NULL procedure bytes received. In another aspect, the threshold may be based on a time elapsed since a command was sent to the UICC (i.e., since the UICC operation started).

Furthermore, in an aspect, at block 304, if the UE determines that the UICC operation has not exceeded (or, in some examples, has not met) the threshold, then the methodology 300 may return to the monitoring at block 302. As noted above, the determination may be performed by threshold managing component 202. Alternatively, if the UE determines that the UICC operation has exceeded (or, in some examples, has met) the threshold at block 304, the UE may provide, at block 306, a first notification to a user interface at least indicating that the UICC is ongoing. In an aspect, threshold managing component 202 of FIG. 2 may make the determination and the user interface managing component 208 of FIG. 2 may send the first notification to the user interface 214 of FIG. 2.

In addition, at block 308, as part of providing the first notification, the UE may provide an estimated progress status indication to the user interface. In an aspect, the progress may be estimated based on the type of UICC operation being performed. In another aspect, the progress may be estimated based on a value received from the UICC, such as a percentage or fraction of total calculations or processes of the operation that have been completed. In still another aspect, the progress may be estimated based on prior UICC operations performed by the UE. For example, the UICC manager 106 may be configured to store a number of calculations or processes that were required to complete the operation in the past and may subsequently utilize this prior UICC operation information to determine an estimated progress of a current operation. In addition, in some examples, the user interface managing component 208 of FIG. 2 may perform the progress estimation.

Additionally, at block 310, as an additional and/or alternative part of providing the first notification, the UE may provide an abort option to prematurely terminate the UICC operation. In an aspect, the user interface managing component 208 of FIG. 2 may prompt the user interface 214 of FIG. 2 to provide an abort option along with the first notification. Furthermore, in an aspect in which the first notification includes an abort option, at block 312 the UE may determine whether the abort option is selected. In an aspect, this determination may be performed by the user interface managing component 208.

In an additional aspect of methodology 300, if the UE determines that the abort option has been selected at block 312, then at block 314, the UE may terminate the UICC operation. In an aspect, the UICC operation terminating component 218 may terminate the UICC operation based on reception of the first notification that the abort option has been selected. Furthermore, at block 316, the UE may determine whether the UICC operation is complete. In an aspect, the UE may perform the determination where the abort option has not been selected at block 312. In an aspect, the UICC manager 106 of FIG. 2 may perform such a determination. If, however, at block 316, the UE determines that the UICC operation is not complete, then methodology 300 may return to block 306. As noted above, the UICC manager 106 may perform this determination.

In an aspect, if the UE determines that the UICC operation is complete at block 316, then at block 318 the UE may provide an indication of the successful completion of the UICC operation to the user interface. In an aspect, the indication may be through removal of a previously present notification. In some examples, the UICC manager 106 may determine through interactions with the UICC that the UICC operation is complete and may notify the user interface managing component 208 of FIG. 2. Further, the user interface managing component 208 may provide a second notification to the user interface 214 of FIG. 2 indicating that the UICC operation is complete.

Figure 4:
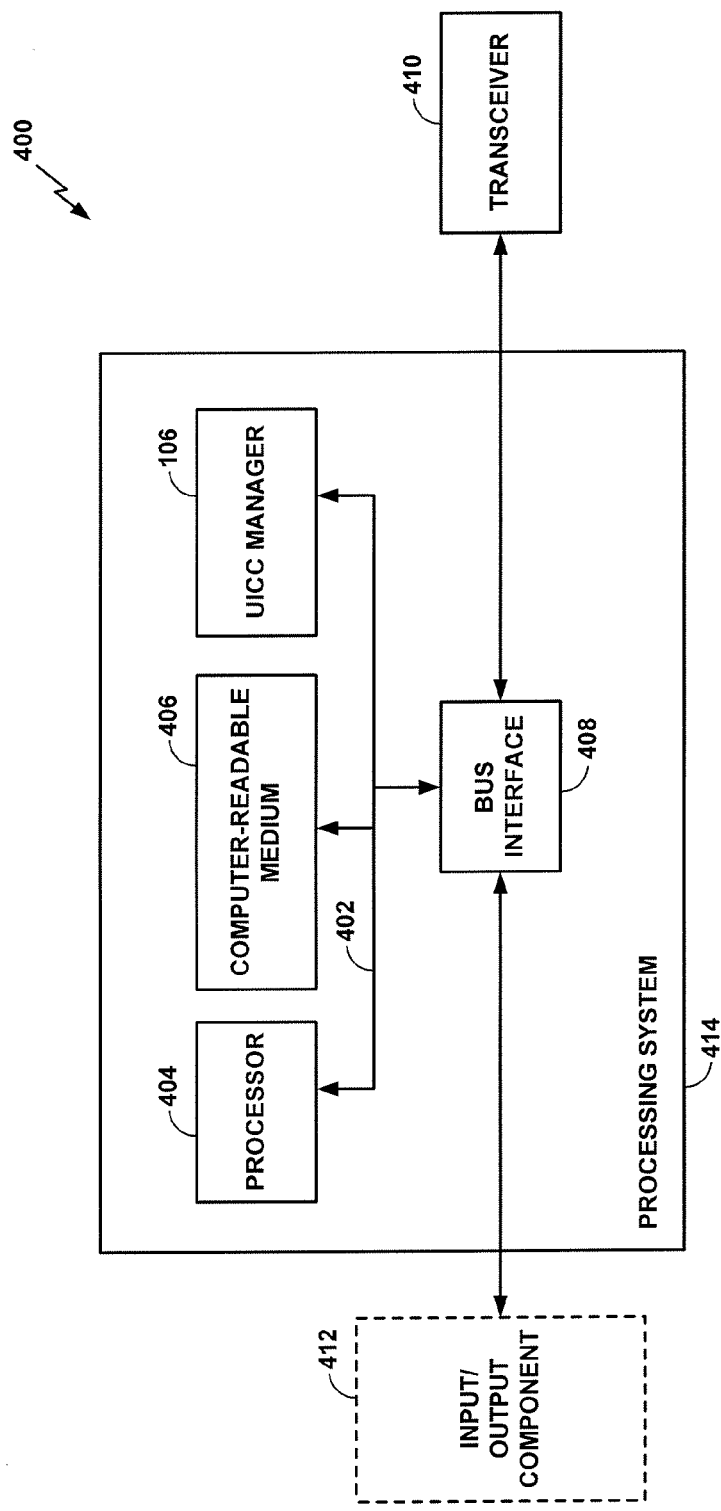
FIG. 4 is a diagram illustrating an example of a hardware implementation for an apparatus employing a processing system.

FIG. 4 is a conceptual diagram illustrating an example of a hardware implementation for an apparatus 400 employing a processing system 414. In some examples, the processing system 414 may comprise a UE or a component of a UE (e.g., UE 102 of FIG. 1). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, and an UICC manager 106 (see FIGS. 1 and 2), which may be configured to carry out one or more methods or procedures (e.g., methodology 300 of FIG. 3) described herein. In an aspect, UICC manager 106 may be implemented as hardware modules, software modules, or a combination of hardware and software modules. For example, UICC manager 106 or a portion thereof may be implemented by processor 404 executing instructions for processes associated with UICC manager 106 that may be stored on computer-readable medium 406.

The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, an input/output component 412 (e.g., keypad, display, speaker, microphone, joystick) may also be provided. In some aspects, the input/output component 412 may include or may be part of the user interface 214 of FIG. 2.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

In one configuration, the apparatus 400 may comprise an apparatus for wireless communication, and may include means for executing one or more functions, methods, methodologies, or processes described by the present disclosure. Such means may be realized, for example, by one or more components of UICC manager 106, computer-readable medium 406, and/or processor 404. For example, apparatus 400 may include means for monitoring, by a UE, one or more items received from a UICC of the UE during a UICC operation, means for determining that a number of a first item of the one or more items that have been received from the UICC exceeds a threshold number, means for determining that an elapsed time since the UICC operation started exceeds a threshold time, and means for providing a first notification to a user interface associated with the UE at least indicating that the UICC operation is ongoing. In an aspect, the means for providing may be further configured to provide an abort option through the user interface to allow a user an option to terminate the UICC operation prior to completion. In an aspect, the means for providing may be further configured to provide an estimated progress status indication for the UICC operation through the user interface (e.g., input/output component 412). In such an aspect, the means for providing may be further configured to provide an abort option through the user interface to allow a user to terminate the UICC operation prior to completion. In a further aspect, the apparatus 400 may further include means for receiving a user input through the user interface indicating that the abort option has been selected, and means for terminating the UICC operation prior to completion. In such an aspect, the apparatus 400 may include means for receiving a second item of the one or more items that indicates that the UICC operation is complete, and at least one of means for removing the first notification from the user interface, or means for providing a second notification indicating a successful completion of the UICC operation to the user interface. Moreover, the means for providing may be further configured to provide an option to make an emergency call.

Figure 5:
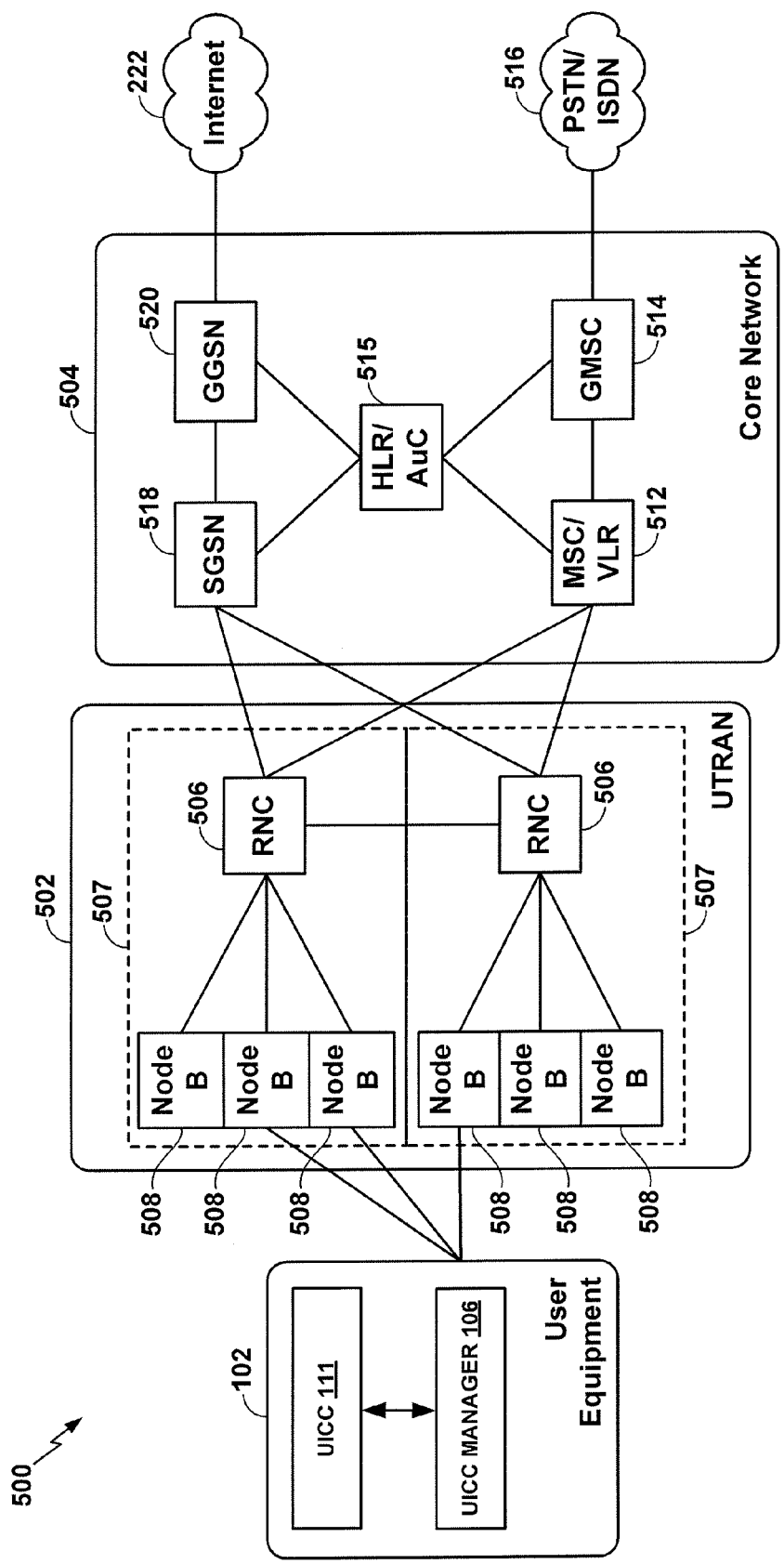
FIG. 5 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 500 employing a W-CDMA air interface. A UMTS network includes three interacting domains: a Core Network (CN) 504, a UMTS Terrestrial Radio Access Network (UTRAN) 502, and UE 102, which may comprise UE 102 of FIG. 1. As illustrated in FIG. 5, UE 102 may include a UICC 111 and a UICC manager 106 as described herein with reference to FIGS. 1 and 2, and may be configured to perform aspects of methodology 300 of FIG. 3. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 102 and a Node B 508 may be considered as including a physical (PHY) layer and a medium access control (MAC) layer. Further, communication between a UE 102 and an RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each SRNS 507; however, the SRNSs 507 may include any number of wireless Node Bs. The Node Bs 508 provide wireless access points to a core network (CN) 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. As indicated above, in a UMTS system, the UE 102 may further include a UICC 511, which contains a user's subscription information to a network, and may also comprise UICC manager 106 of FIGS. 1 and 2. For illustrative purposes, one UE 102 is shown in communication with a number of the Node Bs 508. The downlink (DL), also called the forward link, refers to the communication link from a Node B 508 to a UE 102, and the uplink (UL), also called the reverse link, refers to the communication link from a UE 102 to a Node B 508.

The core network 504 interfaces with one or more access networks, such as the UTRAN 502. As shown, the core network 504 is a GSM core network. However, as those skilled in the art will recognize, the various concepts presented throughout this disclosure may be implemented in a RAN, or other suitable access network, to provide UEs with access to types of core networks other than GSM networks.

The core network 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a visitor location register (VLR) that contains subscriber-related information for the duration that a UE is in the coverage area of the MSC 512. The GMSC 514 provides a gateway through the MSC 512 for the UE to access a circuit-switched network 516. The core network 504 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The core network 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 508 and a UE 102. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 6:
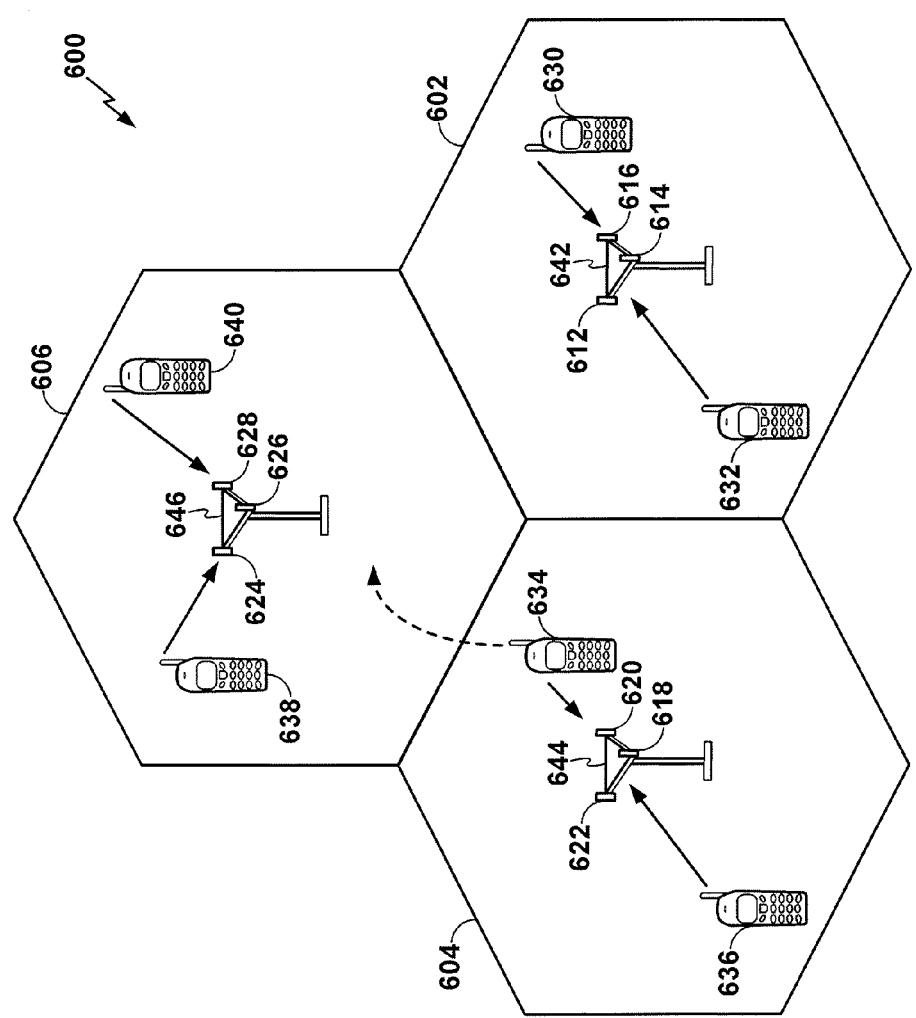
FIG. 6 is a conceptual diagram illustrating an example of an access network.

Referring to FIG. 6, an access network 600 in a UTRAN architecture is illustrated. In an example aspect, the UTRAN architecture may be associated with a network associated with UE 102 having UICC 111 and UICC manager 106 and may include network entity 104 of FIG. 1. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices (e.g., UEs 102 of FIG. 1), which may be in communication with one or more sectors of each cell 602, 604 or 606. For example, UEs 630 and 632 may be in communication with Node B 642, UEs 634 and 636 may be in communication with Node B 644, and UEs 638 and 640 (which may represent UE 102 of FIG. 1) can be in communication with Node B 646. Here, each Node B 642, 644, 646 is configured to provide an access point to a core network 204 (see FIG. 2) for all the UEs 630, 632, 634, 636, 638, 640 in the respective cells 602, 604, and 606.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (see FIG. 5), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
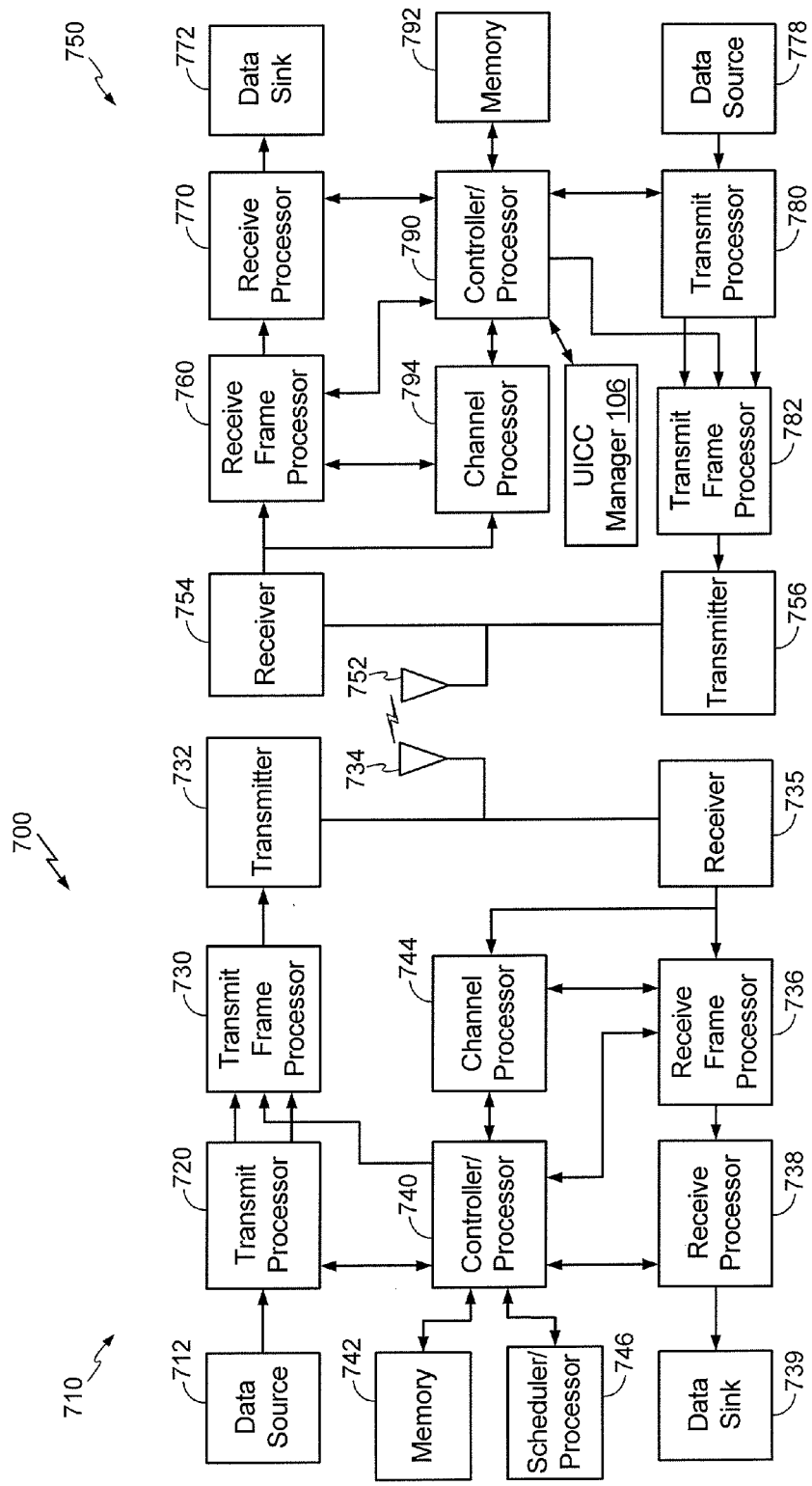
FIG. 7 is a block diagram conceptually illustrating an example of a Node B in communication with a UE in a telecommunications system.

FIG. 7 is a block diagram of a Node B 710 in communication with a UE 750, where the Node B 710 may be the network entity 104 in FIG. 1, and the UE 750 may be the UE 102 of FIG. 1, and may include UICC manager 106 in communication with controller/processor 790, for example. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein. The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
monitoring, by a user equipment (UE), one or more items received from a Universal Integrated Circuit Card (UICC) of the UE during a UICC operation, wherein one or more functions associated with the UICC are blocked from proceeding during the UICC operation;
determining that at least one of:
a number of the one or more items having a first item type exceeds a threshold number; or
an elapsed time since the UICC operation started exceeds a threshold time; and
providing, based on the determining, a first notification to a user interface associated with the UE indicating that the UICC operation is ongoing.

2. The method of claim 1, further comprising providing an abort option through the user interface to allow a user to terminate the UICC operation prior to completion of the UICC operation.

3. The method of claim 2, wherein the abort option is provided after a time duration beyond an estimated total time for the UICC operation has elapsed.

4. The method of claim 2, further comprising:
receiving a user input through the user interface indicating that the abort option has been selected; and
terminating the UICC operation prior to completion of the UICC operation.

5. The method of claim 1, further comprising providing an estimated progress status indication for the UICC operation through the user interface.

6. The method of claim 5, wherein the estimated progress status indication is based on a type of the UICC operation.

7. The method of claim 6, wherein the type of the UICC operation is at least one of:
a public key generation operation; and
an installation of an applet on the UICC.

8. The method of claim 1, further comprising:
receiving an item of the one or more items having a second item type that indicates that the UICC operation is complete; and
removing the first notification from the user interface based on receiving the item having the second item type.

9. The method of claim 8, further comprising providing a second notification to the user interface indicating successful completion of the UICC operation based on receiving the item having the second item type.

10. The method of claim 1, wherein the determining includes determining the number of the one or more items having the first item type exceeds the threshold number, and wherein the first item type comprises a NULL procedure byte.

11. An apparatus for wireless communications, comprising:
means for monitoring, by a user equipment (UE), one or more items received from a Universal Integrated Circuit Card (UICC) of the UE during a UICC operation, wherein one or more functions associated with the UICC are blocked from proceeding during the UICC operation;
means for determining that at least one of:
a number of the one or more items having a first item type exceeds a threshold number; or
an elapsed time since the UICC operation started exceeds a threshold time; and
means for providing, based on the determining, a notification to a user interface associated with the UE indicating that the UICC operation is ongoing.

12. The apparatus of claim 11, further comprising means for providing an abort option through the user interface to allow a user to terminate the UICC operation prior to completion of the UICC operation.

13. The apparatus of claim 12, further comprising:
means for receiving a user input through the user interface indicating that the abort option has been selected; and
means for terminating the UICC operation prior to completion of the UICC operation.

14. The apparatus of claim 11, further comprising means for providing an estimated progress status indication for the UICC operation through the user interface.

15. The apparatus of claim 11, further comprising:
means for receiving an item of the one or more items having a second item type that indicates that the UICC operation is complete; and
means for removing the notification from the user interface based on receiving the item having the second item type.

16. An apparatus for wireless communications, comprising:
a monitoring component configured to monitor, by a user equipment (UE), one or more items received from a Universal Integrated Circuit Card (UICC) of the UE during a UICC operation, wherein one or more functions associated with the UICC are blocked from proceeding during the UICC operation;
a threshold managing component configured to determine that at least one of:

a number of the one or more items having a first item type exceeds a threshold number; or an elapsed time since the UICC operation started exceeds a threshold time; and a user interface managing component configured to provide, based on the determining, a notification to a user interface associated with the UE indicating that the UICC operation is ongoing.

17. The apparatus of claim 16, wherein the user interface managing component is configured to provide an abort option through the user interface to allow a user to terminate the UICC operation prior to completion of the UICC operation.

18. The apparatus of claim 17, wherein the user interface managing component is configured to receive a user input through the user interface indicating that the abort option has been selected; and further comprising:

a UICC operation terminating component configured to terminate the UICC operation prior to completion of the UICC operation.

19. The apparatus of claim 16, wherein the user interface managing component is further configured to provide an estimated progress status indication for the UICC operation through the user interface.

20. The apparatus of claim 16, wherein the monitoring component is further configured to receive an item of the one or more items having a second item type that indicates that the UICC operation is complete; and wherein the user interface managing component is further configured to remove the notification from the user interface based on receiving the item having the second item type.

21. A non-transitory computer-readable medium, comprising instructions, that when executed by a processor, cause the processor to:

monitor, by a user equipment (UE), one or more items received from a Universal Integrated Circuit Card (UICC) of the UE during a UICC operation, wherein one or more functions associated with the UICC are blocked from proceeding during the UICC operation;

determine that at least one of:

a number of the one or more items having a first item type exceeds a threshold number; or an elapsed time since the UICC operation started exceeds a threshold time; and provide, based on the determining, a first notification to a user interface associated with the UE indicating that the UICC operation is ongoing.

22. The computer-readable medium of claim 21, further comprising instructions, that when executed by the processor, cause the processor to provide an abort option through the user interface to allow a user to terminate the UICC operation prior to completion of the UICC operation.

23. The computer-readable medium of claim 22, wherein the abort option is provided after a time duration beyond an estimated total time for the UICC operation has elapsed.

24. The computer-readable medium of claim 22, further comprising instructions, that when executed by the processor, cause the processor to:

receive a user input through the user interface indicating that the abort option has been selected; and terminate the UICC operation prior to completion of the UICC operation.

25. The computer-readable medium of claim 21, further comprising instructions, that when executed by the processor, cause the processor to provide an estimated progress status indication for the UICC operation through the user interface.

26. The computer-readable medium of claim 25, wherein the estimated progress status indication is based on a type of the UICC operation.

27. The computer-readable medium of claim 26, wherein the type of the UICC operation is at least one of:

a public key generation operation; and an installation of an applet on the UICC.

28. The computer-readable medium of claim 21, further comprising instructions, that when executed by the processor, cause the processor to:

receive an item of the one or more items having a second item type that indicates that the UICC operation is complete; and remove the first notification from the user interface based on receiving the item having the second item type.

29. The computer-readable medium of claim 28, further comprising instructions, that when executed by the processor, cause the processor to provide a second notification to the user interface indicating successful completion of the UICC operation based on receiving the second item having the second item type.

30. The computer-readable medium of claim 21, wherein the instructions to determine include instructions to determine the number of the one or more items having the first item type exceeds the threshold number, and wherein the first item type comprises a NULL procedure byte.

* * * * *